United States Patent
Tanaka

(10) Patent No.: US 10,987,939 B2
(45) Date of Patent: Apr. 27, 2021

(54) COLOR CONVERSION PROFILE CREATION DEVICE, COLOR CONVERSION PROFILE CREATION METHOD, AND PROGRAM THEREFOR

(71) Applicant: SEIKO EPSON CORPORATION, Tokyo (JP)

(72) Inventor: Katsuyuki Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 27 days.

(21) Appl. No.: 16/683,384

(22) Filed: Nov. 14, 2019

(65) Prior Publication Data
US 2020/0156384 A1 May 21, 2020

(30) Foreign Application Priority Data
Nov. 16, 2018 (JP) .............................. JP2018-215261

(51) Int. Cl.
*B41J 2/21* (2006.01)
*H04N 1/60* (2006.01)

(52) U.S. Cl.
CPC ............ *B41J 2/2103* (2013.01); *H04N 1/603* (2013.01); *H04N 1/6016* (2013.01); *H04N 1/6019* (2013.01)

(58) Field of Classification Search
CPC ............. H04N 1/6058; H04N 1/40087; H04N 1/4057; H04N 1/603; H04N 1/6016; H04N 1/6019; B41J 2/2103
See application file for complete search history.

(56) References Cited

U.S. PATENT DOCUMENTS

| | | | |
|---|---|---|---|
| 5,795,082 A | 8/1998 | Shimada et al. | |
| 5,926,191 A | 7/1999 | Kanematsu et al. | |
| 6,145,962 A | 11/2000 | Kanematsu et al. | |
| 10,277,782 B2 * | 4/2019 | Tanaka ................. | H04N 1/6008 |
| 10,540,582 B2 * | 1/2020 | Ito ............................. | G06T 1/00 |

(Continued)

FOREIGN PATENT DOCUMENTS

| | | |
|---|---|---|
| JP | 10-211693 A | 8/1998 |
| JP | 2002-059571 A | 2/2002 |

(Continued)

*Primary Examiner* — An H Do
(74) *Attorney, Agent, or Firm* — Global IP Counselors, LLP

(57) ABSTRACT

To set a shading relationship between the plurality of shading inks having the same system color and different densities included in a plurality of kinds of inks, to perform provisional color separation processing to decide a color space value in a virtual color space in the second color system for every lattice point that defines a correspondence relationship between the first and second color spaces, to perform first processing of setting a position of the lattice point where a generation amount of the first ink at the lattice point can be maximized and an ink amount at the lattice point for a first ink which is one of light inks from a result of the provisional color separation processing, and then to perform second processing of setting an ink amount of the first ink and an ink amount of a second ink having a higher density by giving priority to a use of the first ink while maintaining a virtual color space value of the provisional color separation processing result for the first ink.

12 Claims, 14 Drawing Sheets

(56) References Cited

U.S. PATENT DOCUMENTS

| | | | |
|---|---|---|---|
| 10,638,020 B2* | 4/2020 | Ochiai | ................ H04N 1/6025 |
| 2018/0063382 A1 | 3/2018 | Tanaka et al. | |
| 2019/0026611 A1 | 1/2019 | Ito | |

FOREIGN PATENT DOCUMENTS

| | | | |
|---|---|---|---|
| JP | 2002-200778 A | 7/2002 |
| JP | 2004-291459 A | 10/2004 |
| JP | 2006-321051 A | 11/2006 |
| JP | 2009-101703 A | 5/2009 |
| JP | 2018-037761 A | 3/2018 |
| WO | 2017/104449 A1 | 10/2018 |

* cited by examiner

FIG. 3

|  | CYAN C | LIGHT CYAN Lc |
|---|---|---|
| VIRTUAL C | 1.000 | 0.452 |
| VIRTUAL M | 0.000 | −0.152 |
| VIRTUAL Y | 0.000 | −0.099 |
| VIRTUAL K | 0.000 | 0.000 |

FIG. 4

|  | MAGENTA M | LIGHT MAGENTA Lm |
|---|---|---|
| VIRTUAL C | 1.000 | −0.167 |
| VIRTUAL M | 0.000 | 0.480 |
| VIRTUAL Y | 0.000 | −0.172 |
| VIRTUAL K | 0.000 | 0.000 |

White-Cyan

White-Cyan

COLOR CONVERSION PROFILE CREATION DEVICE, COLOR CONVERSION PROFILE CREATION METHOD, AND PROGRAM THEREFOR

The present application is based on, and claims priority from JP Application Serial Number 2018-215261, filed Nov. 16, 2018, the disclosure of which is hereby incorporated by reference herein in its entirety.

BACKGROUND

1. Technical Field

The present disclosure relates to a technique of creating a color conversion profile.

2. Related Art

In a printing device using shading inks or a printing device separately printing out large, medium, and small dots, it is necessary to decide a ratio of a dark ink to a light ink used to represent a color having a certain density of an image to be represented, a formation ratio of the large, medium, and small dots, or the like with respect to a gradation value of the original image. When the image to be represented is represented in a certain color system, color conversion is performed also including shading of an ink being used in order to represent the image in another ink system. How to set this color conversion profile is extremely important for an image to be printed to accurately reproduce the original image. For this purpose, various methods of creating color conversion profile are proposed in the related arts (for example, JP-A-10-211693, JP-A-2004-291459, and JP-A-2009-101703).

In these methods, an image is represented by using shading inks. At this time, in order to reduce graininess, a light ink dot (hereinafter simply referred to as light dot) is first formed in an area where a gradation value of an input image is low, the number of light dots is increased as a density of the image increases, formation of a dark ink dot (hereinafter simply referred to as dark dot) is started somewhere the density of the image increases, thereafter the light dots are replaced with dark dots as the gradation value of the image becomes higher, and eventually in some cases an image is formed only with the dark dots. The color conversion profile used for such image representation is created sometimes according to the sense of a creator of the color conversion profile or by mechanically associating the gradation of the original image with a generation amount of the shading dots, under a restriction that the total density of the shading ink dots (hereinafter simply referred to as shading dots) corresponds to the density of the image to be represented.

For this reason, no method is proposed for controlling a gradation characteristic of the image represented by the sum of the light dot and the dark dot in the related art. When the light dot is formed, there is no index indicating which gradation value of the image is desirably employed in maximizing the ratio of light dot formation.

SUMMARY

The present disclosure can be implemented as the following aspects or application examples. A color conversion profile created by a first color conversion profile creation device according to an aspect of the present disclosure defines a correspondence relationship between a first color space corresponding to a first color system representing an image to be input and a second color space defined by a use amount of each of a plurality of kinds of inks corresponding to a second color system, and the plurality of kinds of inks include a plurality of shading inks having the same system color and different densities. The color conversion profile creation device includes: a shading setting unit that sets a shading relationship between the plurality of shading inks; a provisional color separation unit that performs provisional color separation processing to decide a color space value in a virtual color space in the second color system for every lattice point that defines a correspondence relationship between the first and second color spaces for inks including at least the shading inks among the plurality of kinds of inks; a light ink setting unit that performs first processing of setting a position of the lattice point where a generation amount of the first ink at the lattice point can be maximized and an ink amount at the lattice point for a first ink which is one of light inks other than the highest density ink among the plurality of shading inks from a result of the provisional color separation processing; and an ink amount setting unit that performs second processing of setting an ink amount of the first ink and an ink amount of a second ink which is an ink other than the first ink among the shading inks by giving priority to a use of the first ink while maintaining a virtual color space value of the provisional color separation processing result for the first ink

BRIEF DESCRIPTION OF THE DRAWINGS

FIG. 3 is an explanatory table exemplifying color space values of a cyan ink and a light cyan ink of lattice points from white to cyan in a virtual CMYK color space.

FIG. 4 is an explanatory table exemplifying color space values of a magenta ink and a light magenta ink of lattice points from white to magenta in the virtual CMYK color space.

DESCRIPTION OF EXEMPLARY EMBODIMENTS

A. First Embodiment

Figure 1:
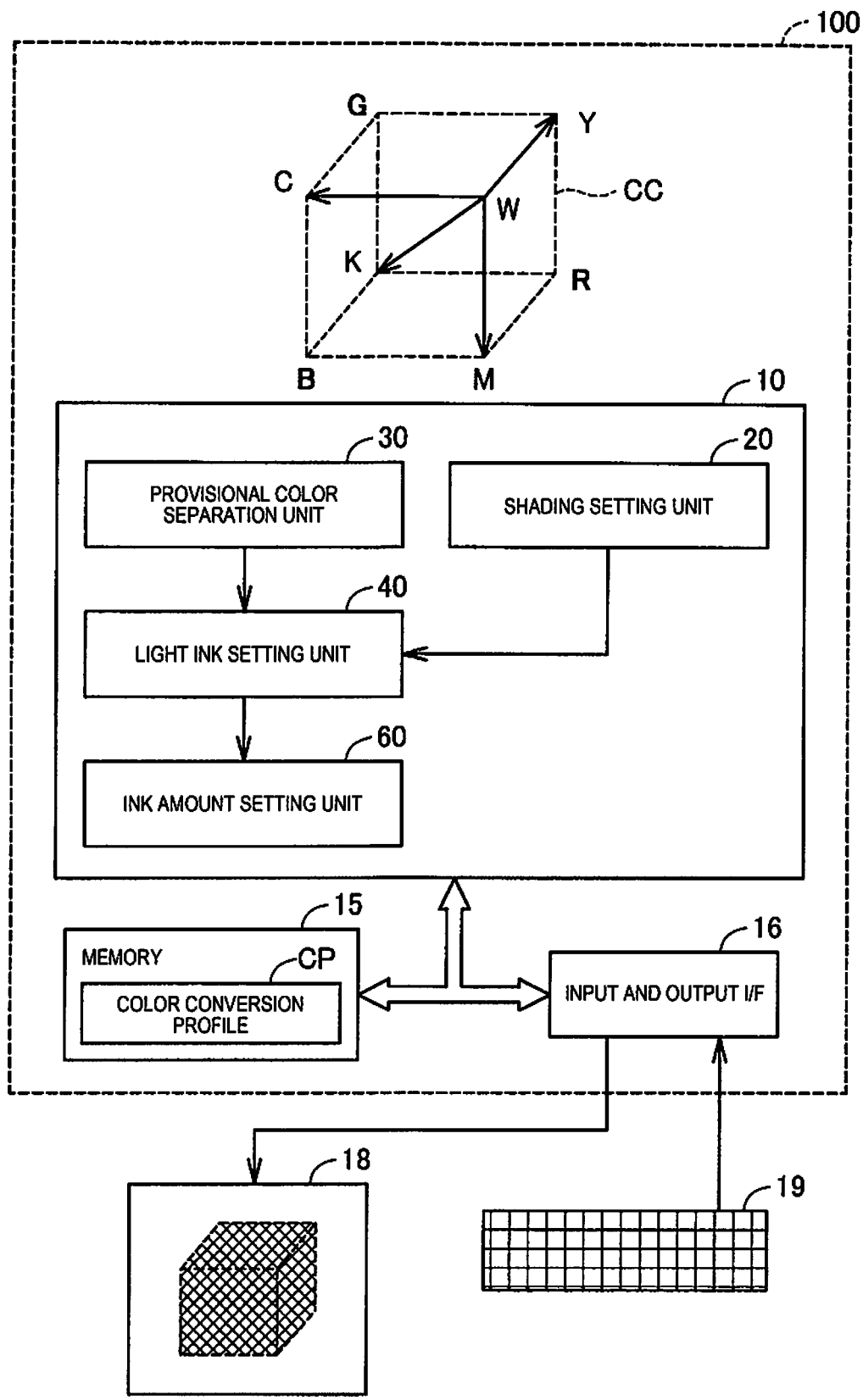
FIG. 1 is a schematic configuration view of a color conversion profile creation device of the embodiment.

A schematic configuration of a color conversion profile creation device 100 according to a first embodiment is shown in FIG. 1. As shown in FIG. 1, this profile creation device includes a CPU 10, a memory 15, and an input and output interface (I/F) 16. The color conversion profile creation device 100 also includes a display 18 for display and an input device 19 such as a keyboard or a mouse for inputting an instruction of a user.

A color conversion profile generated by the color conversion profile creation device 100 defines a correspondence relationship between a first color space corresponding to a first color system representing an image to be input and a second color space defined by a use amount of each of a plurality of kinds of ink corresponding to a second color system. Such a color conversion profile is required and used in a device, such as an inkjet printer, in which the color system of the input image differs from a color system of an image output by the device itself. For example, when an image is represented by 8 bits of RGB each (first color system) and the image is represented by a combination of ink droplets of cyan (C), magenta (M), yellow (Y), and black (K) (second color system) by a printer to which the image is input, the color conversion profile from RGB to CMYK is used. A table in which both values are tabulated such that values of the second color system can be acquired from values of the first color system using the color conversion profile may be referred to as a color conversion look up table (LUT). Since such a color conversion LUT is a set of discrete numerical values, the LUT can be regarded as a collection of lattice points defined by coordinates represented by the numerical values of the first color system. Each lattice point of the color conversion LUT stores from the numerical value of the corresponding second color system. The LUT is a set of one-dimensional lattice points when a target of the color conversion has an achromatic color (monochrome or grayscale), and the LUT is generally a set of three-dimensional or more lattice points when the target has chromatic color. When there is a color conversion LUT of RGB CMYK, the LUT is a set of three-dimensional lattice points.

In the color conversion profile handled in the embodiment, a plurality of colors of inks handled by the printer include a plurality of shading inks having different densities and the same system color. Examples of the plurality of shading inks having different densities and the same system color include a cyan ink and a light cyan ink (Lc) having a density lower than the cyan ink, a magenta ink and a light magenta ink (Lm) having a density lower than the magenta ink, and a black ink and a gray ink (LLk or Lk) having a density lower than the black ink. The color conversion profile may include all of the shading inks or only some of the shading inks. The light ink with respect to the dark ink may be obtained by lowering the density of a dye having a specific color tone, for example, approximately ¼, or by using another dye to have a different density and the same system color. The determination of high and low in density of the ink will be described below.

The CPU 10 executes a program stored in the memory 15 to realize functions as a shading setting unit 20, a provisional color separation unit 30, a light ink setting unit 40, an ink amount setting unit 60, and the like. By realizing the above functions, a color conversion profile CP is generated and stored in the memory 15. Each unit described above that generates the color conversion profile CP can be defined as follows.

The shading setting unit 20 sets a shading relationship between the plurality of shading inks. In the shading setting unit 20, the shading relationship between the inks may be calculated each time or may be set in advance.

The provisional color separation unit 30 performs processing of deciding a color space value in a virtual color space in the second color system for every lattice point that defines the correspondence relationship between the first and second color spaces for the inks including the shading ink among the plurality of colors of inks. In the embodiment, the color space value in the virtual color space is decided prior to the final separation into the use amounts of the plurality of inks corresponding to the second color system. This is because the inks generally handled by the printer are different from pure CMYK. The upper part of FIG. 1 shows a correspondence relationship CC between an RGB color system and a CMY color system in a principle meaning. For example, since an actual cyan ink does not absorb all colors other than cyan, an actually represented color deviates from a straight line from white W to cyan C even when the cyan ink (C) is increased from a point of white W. Therefore, the provisional color separation unit 30 first decides the color space value in the virtual color space in the second color system.

The light ink setting unit 40 receives a result of the processing by the provisional color separation unit 30 and performs first processing of setting a position of the lattice point where a generation amount of a first ink at the lattice point can be maximized and an ink amount at the lattice point for the first ink which is one of the light inks other than the highest density ink among the plurality of shading inks. When the shading inks are the dark ink (for example, cyan C or magenta M) and the light ink (for example, light cyan Lc or light magenta Lm), the first ink is the light ink. When there are three or more kinds of shading inks having the same system color, the first ink is any one of the inks other than the highest density ink. For example, when there are black K, gray Lk having a density lower than black, and light gray LLk having a density further lower than gray for the achromatic colors, the first ink is either gray Lk or light gray LLk.

The ink amount setting unit 60 performs second processing of setting an ink amount of the first ink and an ink amount of a second ink which is an ink other than the first ink among the shading inks by giving priority to the use of the first ink while maintaining the virtual color space value of the result of the provisional color separation processing for the first ink subjected to the first processing. The "maintaining the virtual color space value" means that a difference in a level of a calculation error is allowed. When the shading inks are the dark ink (for example, cyan C or magenta M) and the light ink (for example, light cyan Lc or light magenta Lm), the second ink is the dark ink. When there are three or more kinds of shading inks having the same system color, the first ink is anyone of the inks other than the highest density ink. For example, when there are black K, gray Lk having a density lower than black, and light gray LLk having a density further lower than gray for the achromatic colors, the first ink is either gray Lk or light gray LLk and the second ink is the other or black K.

Figure 2:
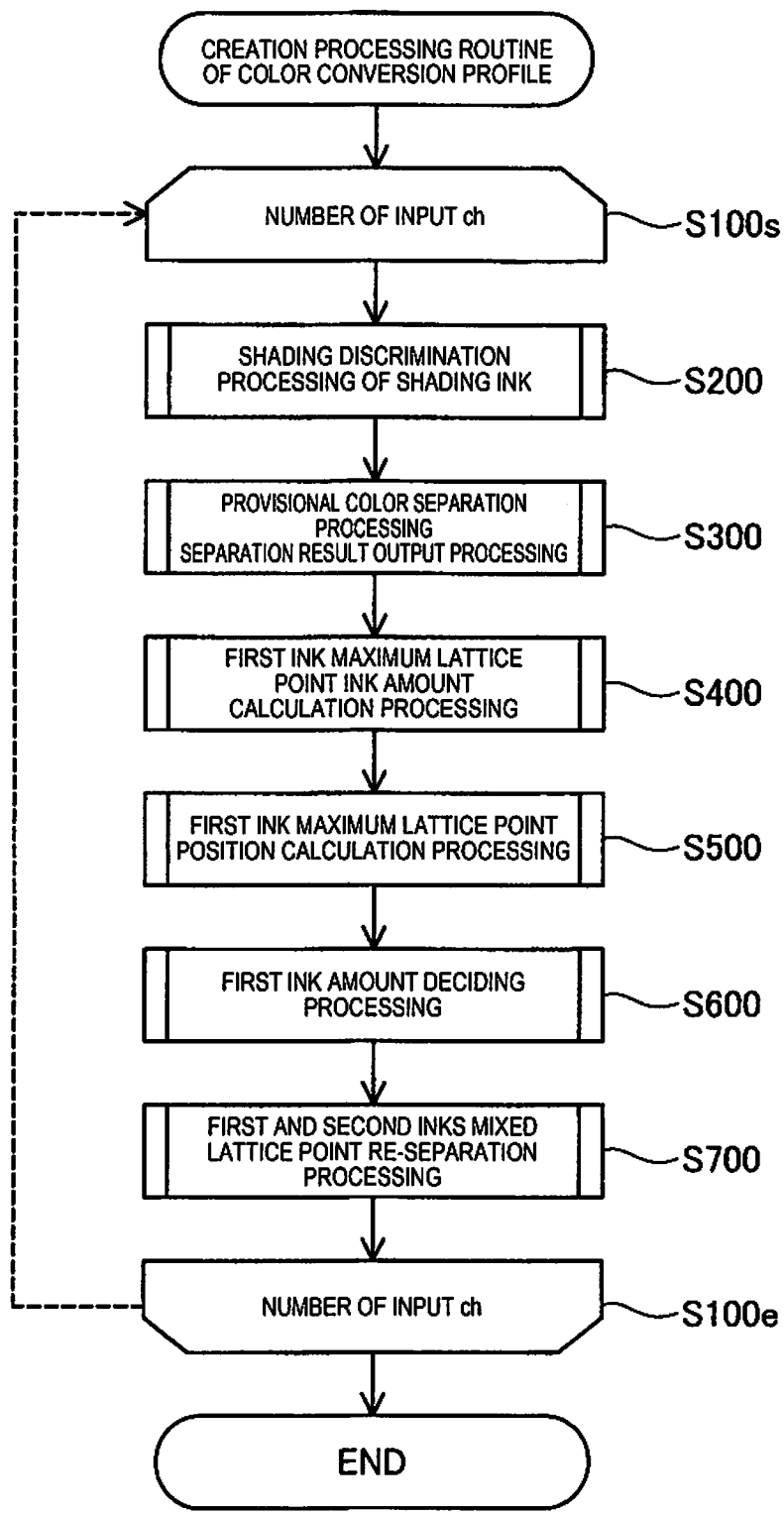
FIG. 2 is a flowchart exemplifying creation processing of a color conversion profile according to a first embodiment.

FIG. 2 is a flowchart showing the processing of each unit of the shading setting unit 20, the provisional color separation unit 30, the light ink setting unit 40, and the ink amount setting unit 60 as processing performed by the CPU 10 of the color conversion profile creation device 100. As shown in FIG. 2, the CPU 10 repeats the processing of steps S200 to S700 for the number of input channels (steps S100s to S100e). The input channel corresponds to the correspondence relationship between the color spaces in which the color conversion profile is created. For example, in a case of a monochrome printer, there is only one achromatic color to be represented. Therefore, a relationship between the first color system on the input side and the second color system on the output side is one channel from black K to white W in terms of the correspondence relationship CC in FIG. 1. The processing is performed on a one-dimensional lattice point included in this input channel. When the number of colors for which the correspondence relationship of color conversion is required to be defined increases, the number of input channels also increases. The processing of steps S100 to S700 is repeated by the number of input channels.

For one input channel, the CPU 10 first performs discrimination processing of the shading ink (step S200). This processing corresponds to the processing realized by the shading setting unit 20. The discrimination processing of the shading ink will be described with reference to FIGS. 3 and 4. When a color space value of a color system on the input side (here, the first color system) is provided, the color conversion profile is used for acquiring a value of a color system on the output side (here, the second color system) corresponding to the color system on the input side. Therefore, the color conversion profile is represented as a lattice point group having the dimension of the number of colors of the color system on the input side. On the other hand, the shading ink generally corresponds to the color system on the output side and the ink being used in the example shown in the correspondence relationship CC in FIG. 1. In step S200, discrimination is made which ink pair is to be the shading ink in each axis of a virtual second color system CMYK.

FIG. 3 shows color space values of the cyan ink C and the light cyan ink Lc at lattice points from white W to cyan C in the correspondence relationship CC in a virtual CMYK color space. As illustrated in FIG. 3, light cyan ink Lc also has the values for magenta and yellow in the virtual color space. However, focusing on virtual C in which the lattice points from white W to cyan C are the input channels, the value of virtual C of the cyan ink is 1.0 and the value of virtual C of the light cyan ink is 0.452. Since the former is larger than the latter, the setting is performed as follows.

Cyan ink C . . . Dark ink
Light cyan ink Lc . . . Light ink

Similarly, FIG. 4 shows color space values of the magenta ink M and the light magenta ink Lm at lattice points from white W to magenta M in the virtual CMYK color space. From the values shown in FIG. 4, the setting is performed as follows for virtual M in which the lattice points from white W to magenta ink M are the input channels.

Magenta ink M . . . Dark ink
Light magenta ink Lm . . . Light ink

In these examples, the shading ink has two kinds of shading. However, even when the shading ink has three kinds or more of shading, the discrimination is similarly performed and the order (rank) of the shading is set.

Figure 5:
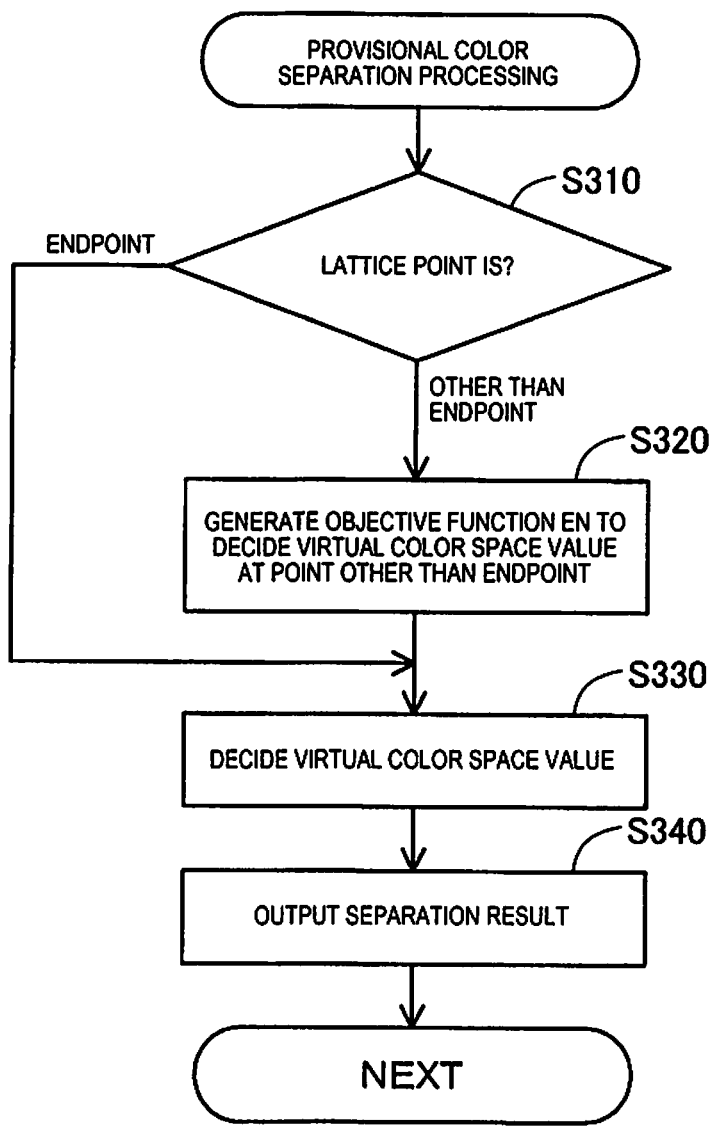
FIG. 5 is a flowchart exemplifying an outline of provisional color separation processing.

For each input channel, the setting of the shading ink is performed and then the provisional color separation processing (step S300) is performed. This processing is a processing of performing the separating into the color space values constituting the virtual second color space using only dark ink instead of directly performing the separating into the final ink amount of each color. The details of the provisional color separation processing (step S300) are shown in FIG. 5. When the provisional color separation processing is started, first, discrimination is made on a selected lattice point in an input channel to be processed (step S310). The lattice point associating the first color space with the second color space may correspond to an endpoint or may correspond to a point other than the endpoint in the correspondence relationship CC. When the number of lattice points per dimension is N (N is a natural number of three or more), the first and N-th lattice points are determined to be the endpoints. When a target lattice point is an endpoint, there is no need to perform the color separation processing since the color space value thereof is a fixed value. When a target lattice point is a point other than the endpoint (step S310: "other than endpoint"), an objective function EN for obtaining the virtual color space value at the point other than the endpoint is set (step S320). The objective function EN used here is for obtaining the best gradation characteristic between the lattice points.

Figure 6:
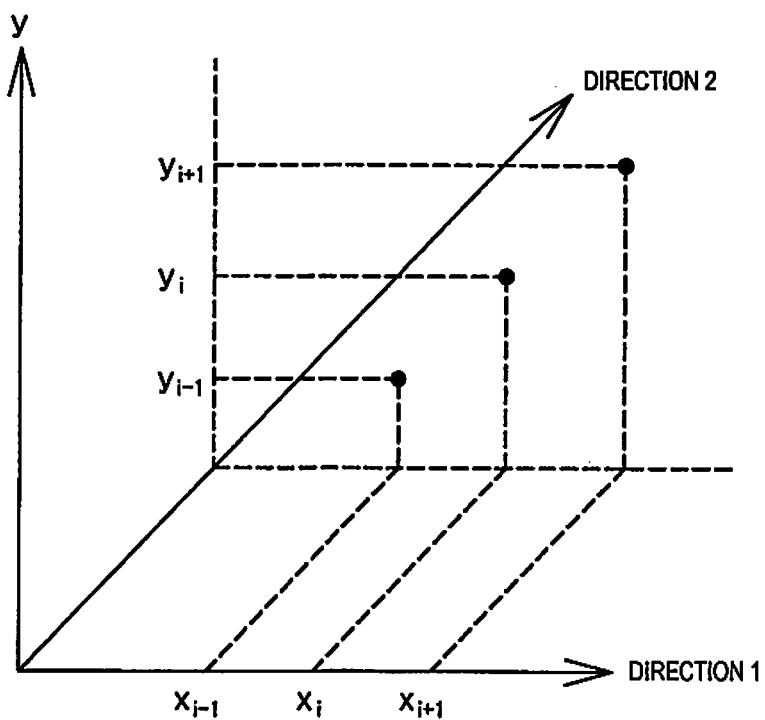
FIG. 6 is a schematic view of a principle of a method of obtaining an objective function.

FIG. 6 is a schematic view of a principle of a method of obtaining an objective function. FIG. 6 shows a case where the second color system is two-dimensional for the sake of simplicity. Further, y shown in FIG. 6 represents a value of a certain dimension of the virtual color space. However, each dimension can be processed independently and thus is represented by illustrated y. The target lattice point is represented by i. At the target lattice point, a direction 1 shown in FIG. 6 is set as a direction defining a first cubic spline function. At this time, the target lattice point is interposed in the direction defining the first cubic spline function, and adjacent lattice points i+1 and i−1 are set to indicate two lattice points for which virtual color space values are already decided. As described above, the virtual color space value of the lattice point of the endpoint is decided. Therefore, in a case where there are N lattice points, when any lattice point that is not the endpoint is set as the target lattice point i at the start of the processing, the lattice point i−1 adjacent to the target lattice point i is the lattice point 1 and the adjacent lattice point i+1 is the lattice point N.

The color space values $x_{i-1}$, $x_i$, and $x_{i+1}$ of the second color system at the lattice points identified by i−1, i, and i+1 are set as independent variables, and corresponding virtual color space values $y_{i-1}$, $y_i$, and $y_{i+1}$ are set as dependent variables. Next, a direction 2 shown in FIG. 6 is set as the direction defining the first cubic spline function, and combinations of independent variables and dependent variables are similarly decided. Here, the virtual color space value $y_i$ is not decided at the start of the processing.

FIG. 6 illustrates the case where the second color system is two-dimensional. When the dimension has a higher order, combinations of independent variables and dependent variables are similarly decided. The combinations of the independent variable and the dependent variable decided in this way are used to generate an objective function that optimizes the gradation characteristic by processing described below, and the color separation for realizing the most desirable gradation characteristic is performed using the objective function.

After the objective function EN is generated, the virtual color space value $y_i$ is calculated so as to minimize the objective function to decide the virtual color space value having the best gradation characteristic (step S330). Various methods can be used to decide a desired virtual color space value, such as solving a general optimization problem. With the calculation of the virtual color space value, a first differential parameter $y'_i$ of the target lattice point and a second differential parameter $y''_i$ are also obtained. A method of calculating the first differential parameter $y'_i$ and the second differential parameter $y''_i$ will also be described in the processing of generating the objective function.

When the virtual color space values are decided using the objective function (step S330), then these results are output as separation results (step S340).

Here, a method of generating the objective function will be described. First, for the sake of simplicity, generation processing of the objective function will be described with a case where the direction defining the first cubic spline function is one (one-dimensional case) as an example. The one-dimensional cubic spline function can be defined as equation (1) for the independent variable x and the dependent variable y. Equation (2) can be obtained by differentiating equation (1) with respect to x.

$$y = \frac{x_{i+1} - x}{x_{i+1} - x_i} y_i + \frac{x - x_i}{x_{i+1} - x_i} y_{i+1} + \quad (1)$$
$$\frac{1}{6}\left(\left(\frac{x_{i+1} - x}{x_{i+1} - x_i}\right)^3 - \frac{x_{i+1} - x}{x_{i+1} - x_i}\right)(x_{i+1} - x_i)^2 y''_i +$$
$$\frac{1}{6}\left(\left(\frac{x - x_i}{x_{i+1} - x_i}\right)^3 - \frac{x - x_i}{x_{i+1} - x_i}\right)(x_{i+1} - x_i)^2 y''_{i+1}$$

$$y' = \frac{1}{x_{i+1} - x_i}(y_{i+1} - y_i) - \frac{1}{2}\frac{(x_{i+1} - x)^2}{x_{i+1} - x_i} y''_i + \quad (2)$$
$$\frac{1}{2}\frac{(x - x_i)^2}{x_{i+1} - x_i} y''_{i+1} - \frac{1}{6}(x_{i+1} - x_i)(y''_{i+1} - y''_i)$$

The following equation (3) can be obtained by equation (2) for $x_{i-1} \leq x \leq x_i$ and equation (2) for $x_i \leq x \leq x_{i+1}$ under a condition that slopes match at $x_i$ in equation (1).

$$\frac{x_i - x_{i-1}}{6} y''_{i-1} + \frac{x_{i+1} - x_{i-1}}{3} y''_i + \frac{x_{i+1} - x_i}{6} y''_{i+1} = \frac{y_{i+1} - y_i}{x_{i+1} - x_i} - \frac{y_i - y_{i-1}}{x_i - x_{i-1}} \quad (3)$$

Here, i identifies a lattice point, and y" indicates a second differential parameter at the corresponding lattice point.

Equation (4) can be obtained by arranging equations obtained by respectively substituting $x = x_{i-1}, x_{i+1}$ into equation (3), equation (2) for $x_{i-1} \leq x \leq x_i$, and equation (2) for $x_i \leq x \leq x_{i+1}$.

$$\begin{bmatrix} y''_{i-1} \\ y''_i \\ y''_{i+1} \end{bmatrix} = A^{-1} B \begin{bmatrix} y_{i-1} \\ y_i \\ y_{i+1} \end{bmatrix} + c \quad (4)$$

Here, A and B represent matrices, and c represents a vector. The matrices and vector are defined by equations (5) to (7). The matrix $A^{-1}$ represents obtaining the inverse of the matrix. Since the second differential parameter of the cubic spline function is obtained on the left side of equation (4), the square sum thereof is obtained and is used as the objective function. This is indicated by equation (8).

$$A = \begin{bmatrix} -\frac{x_i - x_{i-1}}{3} & -\frac{x_i - x_{i-1}}{6} & 0 \\ \frac{x_i - x_{i-1}}{6} & \frac{x_{i+1} - x_{i-1}}{3} & \frac{x_{i+1} - x_i}{6} \\ 0 & \frac{x_{i+1} - x_i}{6} & \frac{x_{i+1} - x_i}{3} \end{bmatrix} \quad (5)$$

$$B = \begin{bmatrix} \frac{1}{x_i - x_{i-1}} & -\frac{1}{x_i - x_{i-1}} & 0 \\ \frac{1}{x_i - x_{i-1}} & -\frac{x_{i+1} - x_{i-1}}{(x_{i+1} - x_i)(x_i - x_{i-1})} & \frac{1}{x_{i+1} - x_i} \\ 0 & \frac{1}{x_{i+1} - x_i} & -\frac{1}{x_{i+1} - x_i} \end{bmatrix} \quad (6)$$

$$c = \begin{bmatrix} y'_{i-1} \\ 0 \\ y'_{i+1} \end{bmatrix} \quad (7)$$

$$E = y''^2_{i-1} + y''^2_i + y''^2_{i+1} \quad (8)$$

Since equation (8) is a function of unknown dependent variable $y_i$ as can be understood from equation (4), it is possible to optimize the gradation characteristic by obtaining $y_i$ that minimizes equation (8).

When the second color space is multi-dimensional, the objective function can be expanded by generating an objective function similar to that of equation (8) with a direction of each dimension as a direction defining the first cubic spline function and adding the generated objective functions to each other. When the dimensions are identified as i, j, and . . . , and each objective function of the dimensions is $E_i$, $E_j$, and . . . , the objective function can be defined as equation (9).

$$E = E_i + E_j + \ldots \quad (9)$$

In the above provisional color separation processing, equation (9) is generated with virtual color space value as the dependent variable of the first cubic spline function. On the other hand, in ink amount deciding processing (step S600), equation (9) is generated with the ink amount as the dependent variable of the first cubic spline function.

The virtual color space value and the first differential parameter $y'_i$ and the second differential parameter $y''_i$ of the ink amount can be respectively obtained by the equations (2) and (4) and thus are respectively calculated in the provisional color separation processing (step S300) and first ink amount deciding processing (step S600) based on the above equations.

On the other hand, when the lattice point identifications i−1 and i+1 correspond to the first or N-th lattice point in the case where the number of lattice points in one dimension is N, that is, when the lattice point is determined to be the endpoint in the provisional color separation processing (step S300), the objective function is generated from equation (3) with the corresponding second differential parameters as $y''_{i-1} = 0$ and $y''_{i+1} = 0$ similar to a general natural spline since $y'_{i-1}$ and $y'_{i+1}$ which are used in defining equation (7) and used in equation (3) are undetermined.

Figure 7:
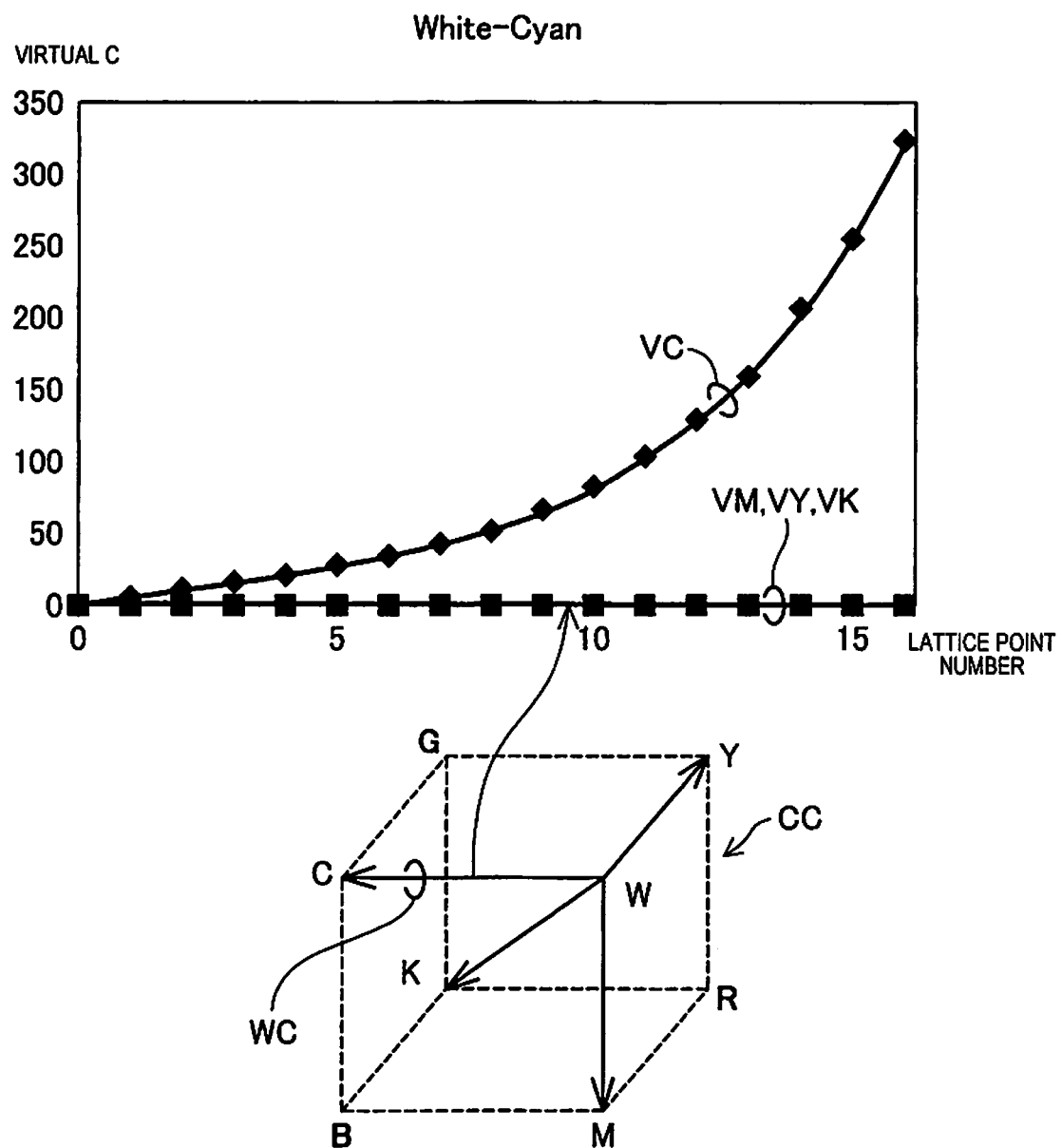
FIG. 7 is an explanatory view of an example in which a provisional color separation is performed along an array of lattice points from white toward cyan in a correspondence relationship between a first color space and a second color space.

The objective functions used in the color separation processing and the provisional color separation processing are briefly described above. The concept of the provisional color separation processing performed as described above is shown in FIG. 7. FIG. 7 shows an example in which the provisional color separation is performed along an array WC of lattice points from white W toward cyan C in the correspondence relationship CC between the first color space and the second color space. The color separation processing using the objective function is performed by sequentially repeating until the lattice points are exhausted such as an intermediate lattice point A (0<A<N) interposed between a lattice point 0 and a lattice point N at both ends and then a lattice point B (0<B<A) interposed between the processed lattice point A and an existing lattice point (the lattice point 0 herein). The provisional color separation for the array WC of lattice points from white W toward cyan C produces a result in which a virtual cyan VC has a significant value and values of other inks, that is, a virtual magenta VM, a virtual yellow VY, and a virtual black VK become substantially zero as the virtual color space value.

Figure 8:
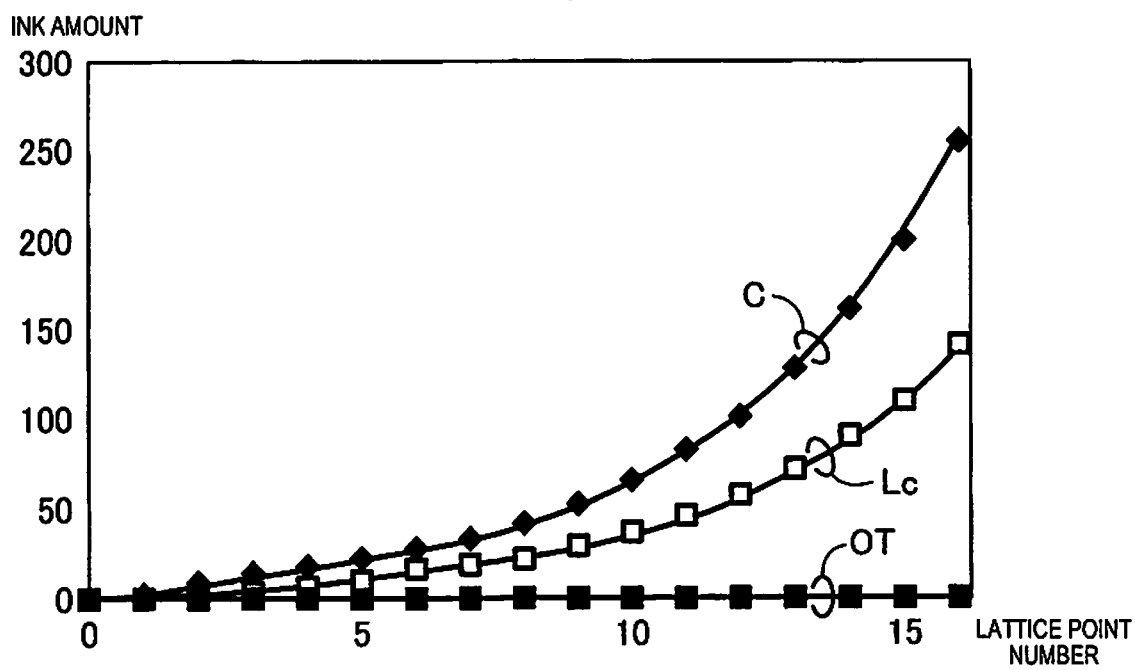
FIG. 8 is an explanatory graph showing an example of a result of the provisional color separation.

FIG. 8 exemplifies a result in which the color separation is performed under the objective function EN that optimizes the gradation characteristic of the virtual cyan VC into the actual cyan ink C and light cyan ink Lc. The result in which the cyan ink C and the light cyan ink Lc have significant values, and values of other inks OT, that is, the yellow ink Y, the black ink K, the magenta ink M, and the light magenta ink Lm in the first embodiment become substantially zero are obtained as actual inks. Since the provisional color separation processing is performed using the objective function that optimizes the gradation characteristic, as shown in FIG. 8, the cyan ink C and the light cyan ink Lc are also generated in the entire lattice point range and both inks are substantially monotonically increased with a change on the input channel side.

After the color separation processing is performed in this manner, first ink maximum lattice point ink amount calculation processing (step S400) is performed. The first ink corresponds to the light cyan ink Lc in the example shown in FIG. 8. This is because the first ink is one of the light inks other than the highest density ink among the plurality of shading inks to be separated as the result of the provisional color separation processing. Here, the shading inks are two of the cyan ink C which is the dark ink and the light cyan ink Lc which is the light ink. Therefore, the first ink is the ink other than the highest density ink, that is, the light cyan ink Lc.

The maximum lattice point of the first ink which is the light cyan ink Lc and the ink amount at the point are equal to or less than a setting value set for the light cyan ink Lc and are decided as the lattice point at which the ink amount of the light cyan ink Lc is maximum and the ink amount at the lattice point. The setting value may be a value set in advance as the maximum amount of the light cyan ink Lc to be used or is decided as an ink duty, that is, the maximum ink amount with which the light cyan ink Lc can be ejected onto a printing medium when the setting value is not set in advance. Even when the ink amount maximum lattice point and the ink amount at the point are set individually, the setting value does not exceed a limit value by the ink duty.

Figure 9:
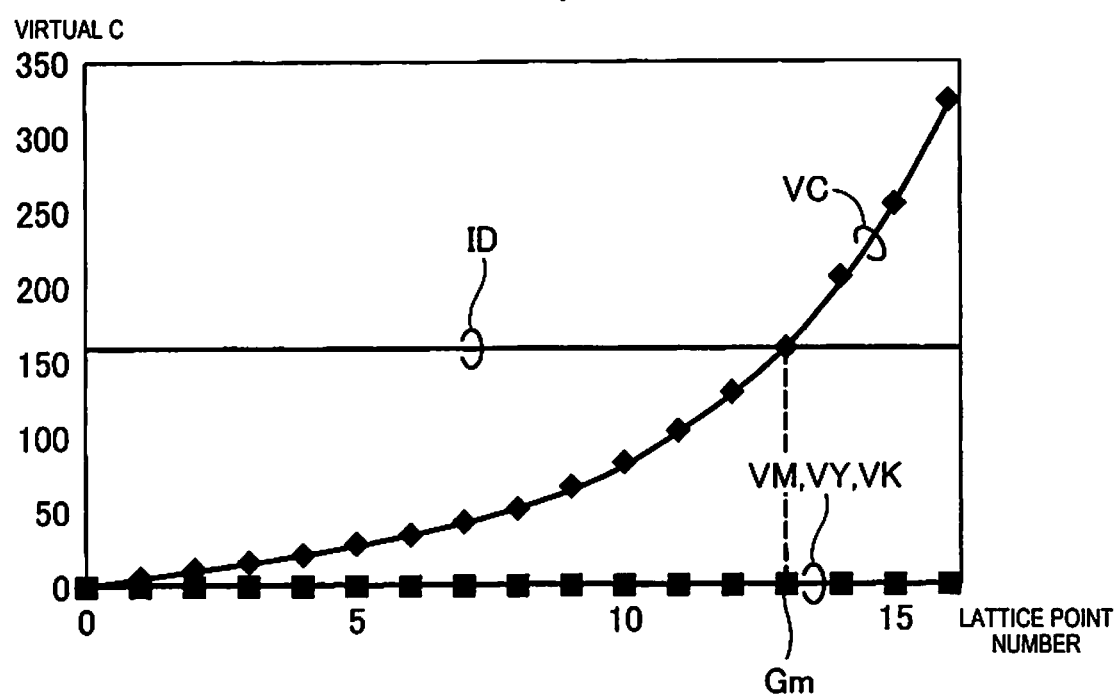
FIG. 9 is an explanatory graph exemplifying a maximum ink amount of a first ink.

The relationship between the ink amount maximum lattice point and the setting value for the light cyan ink Lc is shown in FIG. 9. In FIG. 9, ID indicates the maximum ink amount (ink duty) with which the light cyan ink Lc can be ejected onto the printing medium. The maximum ink amount varies depending on the printing medium. Next, a first ink maximum point position is obtained (step S500). In FIG. 9, the amount of light cyan ink Lc is increased so as to obtain an ink amount VC according to the result of the virtual color separation processing, and the maximum lattice point not exceeding the maximum ink amount ID is obtained as a first ink maximum lattice point Gm. In FIG. 9, the ink amount of the first ink maximum lattice point Gm and the maximum ink amount ID are drawn to match with each other, but both do not necessarily match with each other. The lattice point Gm at which the ink amount of the light cyan ink Lc is the maximum lattice point ink amount is obtained under the restriction by the ink duty or the setting value.

Figure 10:
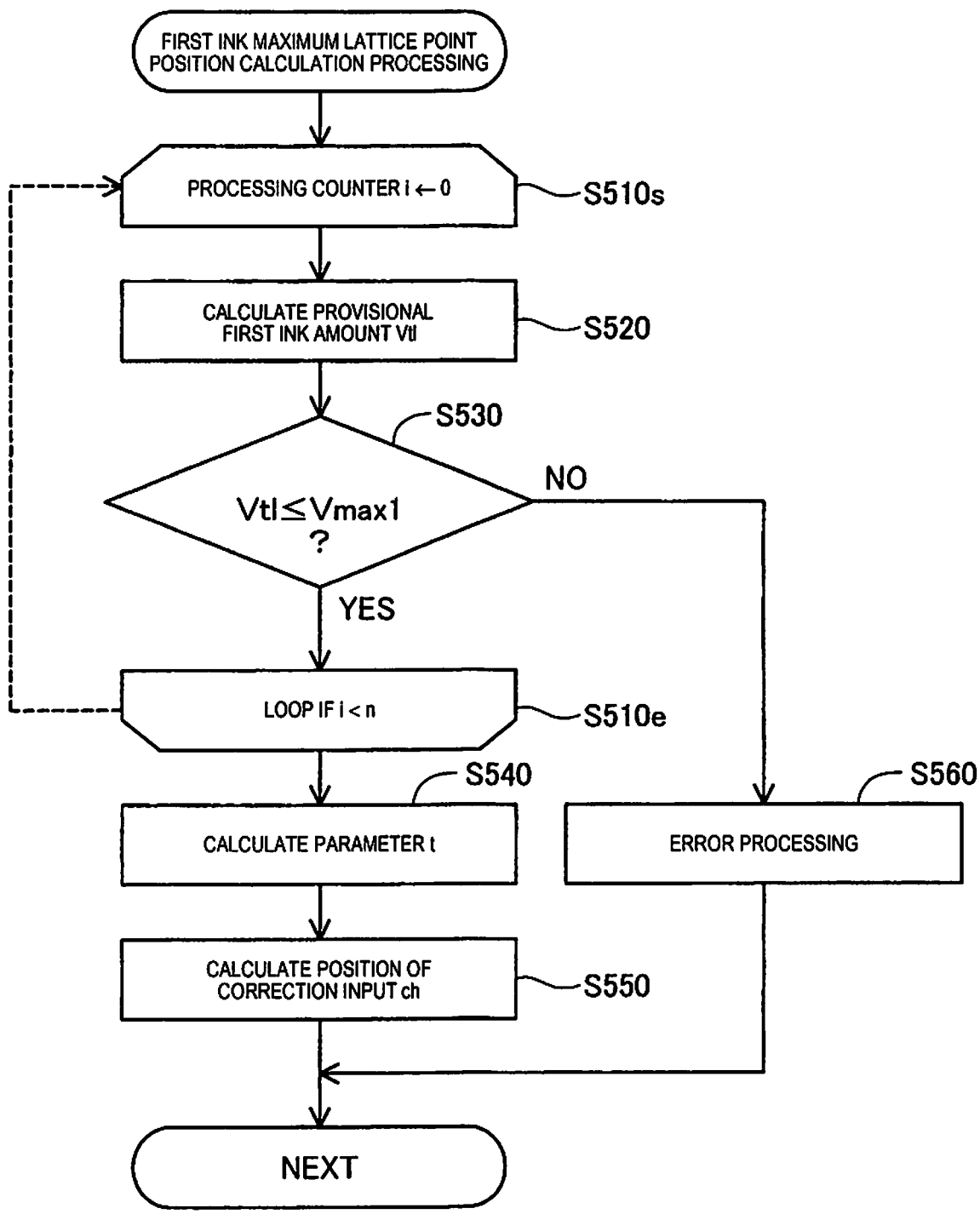
FIG. 10 is a flowchart showing an example of first ink maximum lattice point position calculation processing.

The details of the related processing are shown in FIG. 10. When this processing is started, first, a value of processing counter i for performing repetitive processing is set to zero (step S510s). The counter value i indicates that an i-th lattice point of an array of lattice points to be processed, of the array of the lattice points from white W to cyan ink C in the correspondence relationship CC shown in FIG. 7 herein, is set as a target to be processed. Every time the processing of step S520 and subsequent steps is performed, the value is incremented by one. As a result, the processing of step S520 and subsequent steps is repeated until the value of the counter i reaches the maximum number n of the lattice points (step S510e).

When the processing shown in FIG. 10 is started, first, processing of calculating a provisional first ink amount Vt1 is performed for the i-th lattice point (step S520). In this processing, an ink amount $Vcmyk_p$ of the virtual color space CMYK obtained as the result of the provisional color separation processing already performed is divided by a virtual color space coefficient $CVcmyk_1$ for the first ink to obtain the provisional first ink amount Vt1 according to the following equation (10). When the calculation is performed along the array of the lattice points from white W to cyan ink C, the light cyan ink Lc corresponds to the first ink. Therefore, the calculation of equation (10) is equivalent to obtain an ink amount of the light cyan ink Lc required when the virtual ink amount of cyan obtained in the virtual color space is realized by the light cyan ink in the virtual color space.

$$V_{t1} = \frac{Vcmyk_p}{CVcmyk_1} \quad (10)$$

After this calculation is performed to obtain the first ink amount, determination is made whether the obtained provisional first ink amount Vt1 is equal to or less than an ink amount Vmax1 of the first ink maximum lattice point Gm previously obtained (step S530). The counter i indicating the lattice point is incremented by one when the provisional first ink amount Vt1 is equal to or less than the ink amount Vmax1 of the first ink maximum lattice point Gm obtained previously, and a loop is performed to repeat the above processing when the value of the counter i is less than the maximum number n of the lattice points (step S510e). When the lattice point counter i becomes a value indicating the endpoint and an end condition of the loop is satisfied while the determination in step S530 is not "NO" (step S510e), error processing is performed and the routine ends.

When the processing is normally performed, the provisional first ink amount Vt1 exceeds the ink amount Vmax1 of the first ink maximum lattice point Gm before the end condition of the loop is satisfied ("NO" in step S530). In this case, processing of calculating a correction input channel position is performed (step S540). The correction input channel position is a position of an input channel corresponding to the ink amount Vmax1 of the first ink maximum lattice point Gm when the provisional first ink amount at the lattice point i exceeds the ink amount Vmax1 of the first ink maximum lattice point Gm. This processing is composed of the following two pieces of processing.

[1] Processing of obtaining a parameter t by the following equation (11) by setting the counter value when the provisional first ink amount Vt1 exceeds the ink amount Vmax1 of the first ink maximum lattice point Gm as i and setting the first ink amounts of the lattice point i and the adjacent lattice point i−1 as $IA_i$ and $IA_{i-1}$ (step S540).

[2] Processing of obtaining a position $CInch_p$ of the correction input channel by the following equation (12) using the parameter t (step S550).

After the above pieces of processing are performed, the routine ends.

$$t = \frac{IA_p - IA_i}{IA_{i+1} - IA_i} \quad (11)$$

$$CInch_p = tCInch_{i+1} + (1-t)CInch_i \quad (12)$$

Figure 11:
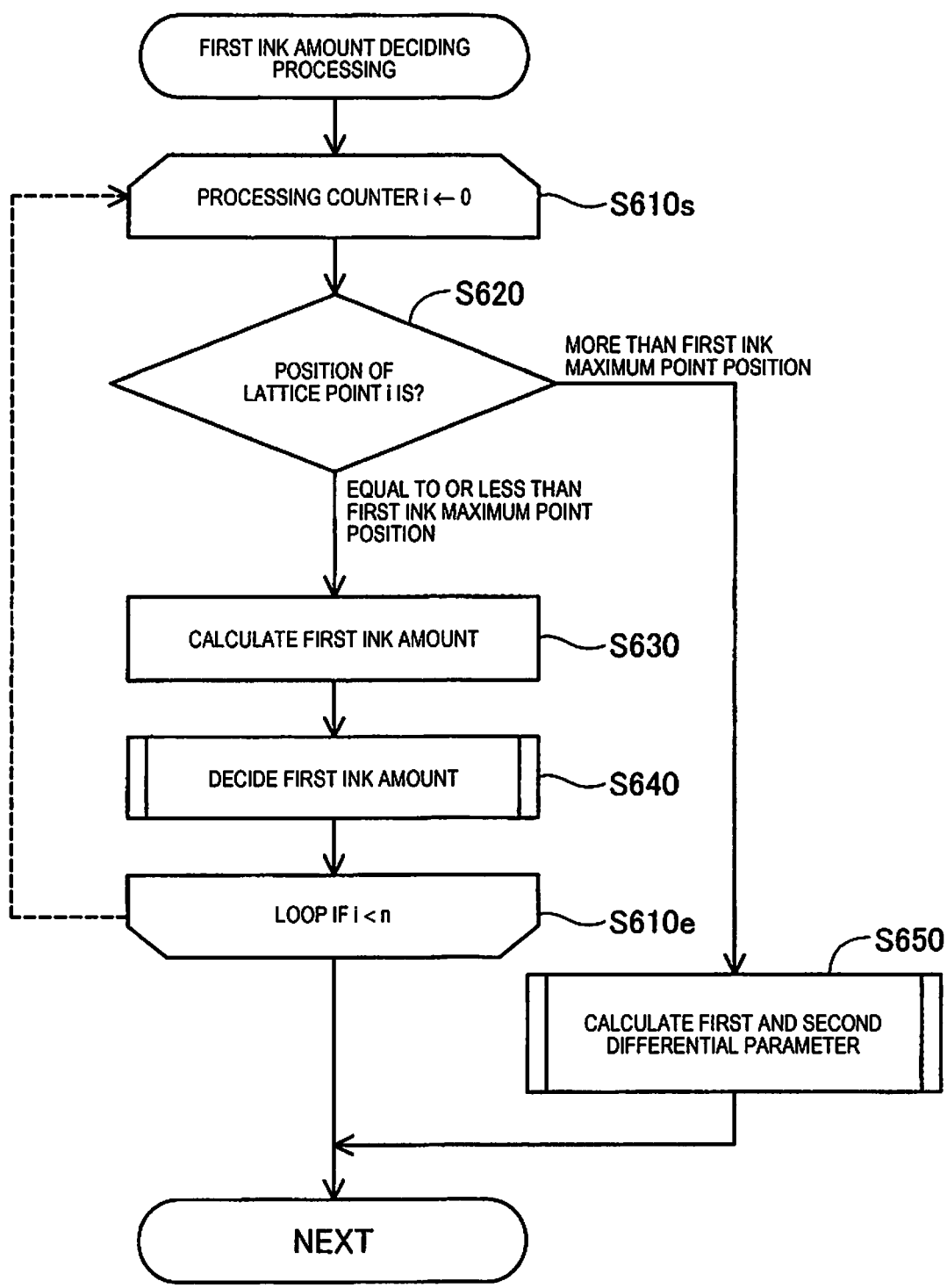
FIG. 11 is a flowchart showing an example of first ink amount deciding processing.

Next, the first ink amount deciding processing (step S600) is performed. The details of this processing are shown in FIG. 11. In this processing, an actual ink amount of the first ink is obtained using the result of the provisional color separation processing (step S300) already performed, and the first ink maximum lattice point ink amount and the position thereof obtained in the first ink maximum lattice point ink amount calculation processing (step S400) and the first ink maximum lattice point position calculation processing (step S500). The processing shown in FIG. 11 corresponds to the processing of deciding the ink amount in a range ALc of FIG. 12. A range BL in FIG. 12 described later corresponds to a range processed by first and second inks mixed lattice point re-separation processing (step S700).

When the processing shown in FIG. 11 is started, first, the value of the processing counter i for performing the repetitive processing is set to zero (step S610s). The counter value i indicates that an i-th lattice point of an array of lattice points to be processed, of the array of the lattice points from white W to cyan ink C in the correspondence relationship CC shown in FIG. 7 herein, is set as a target to be processed.

Next, a position of a lattice point i to be processed is discriminated (step S620). For the i-th lattice point in the array of lattice points to be processed, when the position of the lattice point i is equal to or less than the position of the correction input channel obtained for the first ink maximum lattice point Gm, processing of calculating a first ink amount V1 is performed (step S630). In this processing, the ink amount $Vcmyk_p$ of the virtual color space CMYK is divided by the virtual color space coefficient $CVcmyk_1$ for the first ink to obtain the first ink amount V1 according to the following equation (13). When the calculation is performed along the array of the lattice points from white W to cyan ink C, the light cyan ink Lc corresponds to the first ink. Therefore, the calculation of equation (13) is equivalent to obtaining an actual ink amount of the light cyan ink Lc required when the virtual ink amount of cyan obtained in the virtual color space is realized by the light cyan ink.

$$V_1 = \frac{Vcmyk_p}{CVcmyk_1} \quad (13)$$

After this calculation is performed to obtain the first ink amount V1, determination is made whether the obtained first ink amount V1 is equal to or less than an ink amount Vmax1 of the first ink maximum lattice point Gm previously obtained. When the first ink amount V1 is equal to or less than an ink amount Vmax1 of the first ink maximum lattice point Gm previously obtained, the first ink amount at the lattice point i is decided as the ink amount V1, and the ink amounts of other inks are decided as value 0, and then the ink amounts at the lattice point i are stored in the color conversion profile CP of the memory 15 (step S640). Thereafter, the counter i indicating the lattice point is incremented by one, and a loop is performed to repeat the above processing when the value of the counter i is less than the maximum number n of the lattice points (step S610e).

In step S620, when determination is made that the position of the lattice point i exceeds the position of the correction input channel obtained for the first ink maximum lattice point Gm, next, processing of respectively obtaining the first differential parameter $y'_i$ and the second differential parameter $y''_i$ of the first ink amount by the above equations (2) and (4) between adjacent lattice points for each lattice point processed so far is performed (step S650). The above processing is performed and the processing routine ends.

Figure 12:
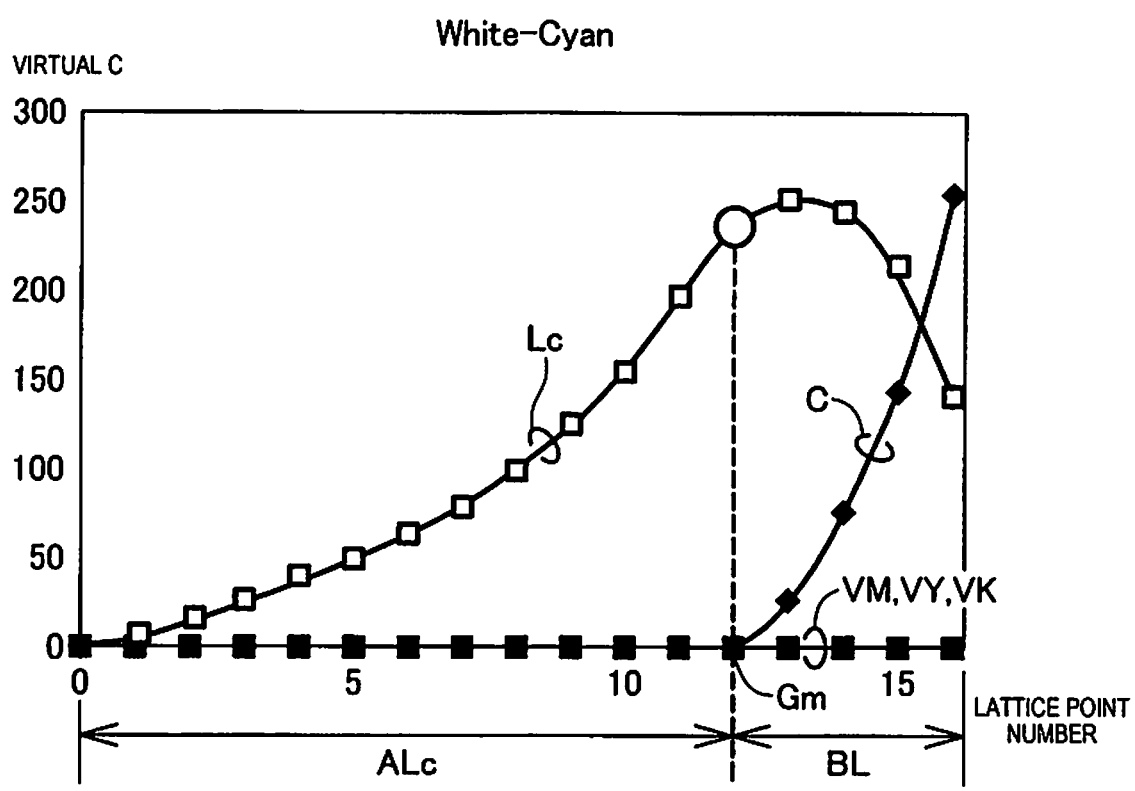
FIG. 12 is an explanatory graph exemplifying a result of mixed lattice point re-separation processing.
Figure 13:
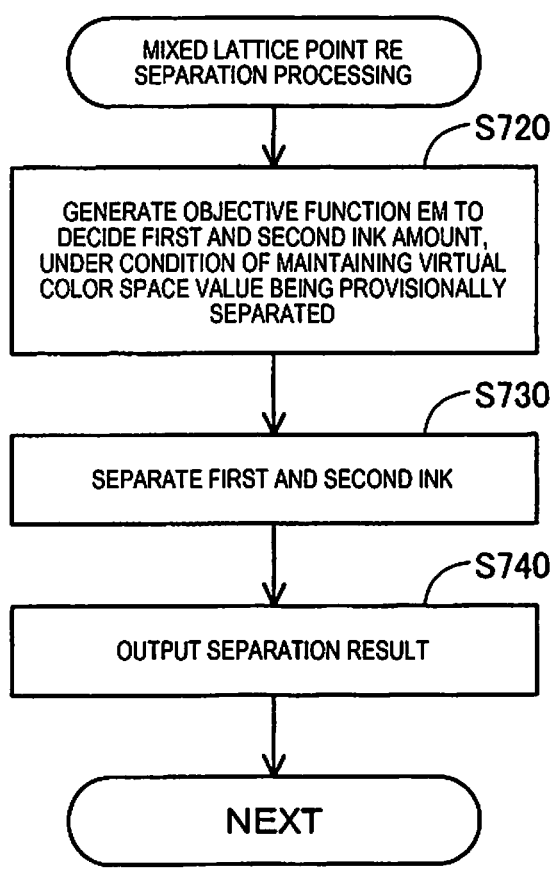
FIG. 13 is a flowchart showing an example of the mixed lattice point re-separation processing.

With this processing, the first ink amount is decided for the range ALc shown in FIG. 12 and is stored in the memory 15 as a part of the color conversion profile CP. Next, processing of obtaining the ink amount in the remaining range, that is, the range BL in FIG. 12 is performed. This processing is the first and second inks mixed lattice point re-separation processing in step S700. The details of this processing are shown in FIG. 13.

When the mixed lattice point re-separation processing is started, first, the same processing as the provisional color separation processing described above is performed. Specifically, first, an objective function EM for deciding the first and second ink amounts such that a gradation change due to the replacement of the first ink and the second ink becomes the best is obtained under a constraint of maintaining the virtual color space value already obtained (step S720). This processing is equivalent to that described in step S320 (refer to FIG. 5) in the provisional color separation processing (step S300).

After the objective function EM is obtained, processing is performed to separate the first and second inks so as to minimize a value of the objective function (step S730). Here, the first ink is the light cyan ink Lc, and the second ink is the cyan ink C. This processing corresponds to the processing of the range BL in FIG. 12. In this range BL, the density of the virtual cyan C of the input channel from white W to cyan C is already determined such that the gradation characteristic becomes the best in the virtual color space. Therefore, the light cyan ink Lc is replaced with the cyan ink C under the constraint of maintaining the virtual color space value.

As a result, it is possible to generate the color conversion profile CP in which the position of the input channel at which the first ink becomes maximum is uniquely obtained as shown as the range BL in FIG. 12 and only the first ink, the light cyan ink Lc in this example, is used until that time, and then the first and second inks are mixed to smoothly perform the replacement of the first ink and the second ink with good gradation characteristic and different shadings.

After the color separation processing is performed in this manner, the result is output to the memory 15 as the color conversion profile CP (step S740). With the above processing, the color separation for one input channel is completed. As shown in FIG. 2, the above processing is repeated as many as the number of input channels to generate color conversion profiles CP corresponding to all input colors. In the first embodiment, separation of the light magenta ink Lm and the magenta ink M is similarly performed for the input channels from white W to magenta M.

According to the first embodiment described above, it is possible to generate the color conversion profile CP for a printer employing an ink system having a plurality of shading inks such that the shading inks can be generated with a clear order regarding the shading of the inks and an image with image quality of achieving both graininess and gradation characteristic can be obtained by performing the color conversion using this color conversion profile CP. In particular, in the above embodiment, there is flexibility in that to which gradation value of an input image the first ink, which is the light ink, is generated and how to replace the first ink with the second ink, which is the dark ink. In the above embodiment, in the provisional color separation, the maximum ink amount ID of the first ink is set as the ink duty of the first ink. However, when the maximum ink amount ID of the first ink is set as a predetermined value smaller than the ink duty of the first ink, it is possible to easily generate the color conversion profile CP according to various conditions since the color separation is performed by obtaining the virtual color space values of the first ink and the second ink with the ink amount ID as an upper limit.

B. Second Embodiment

Figure 14:
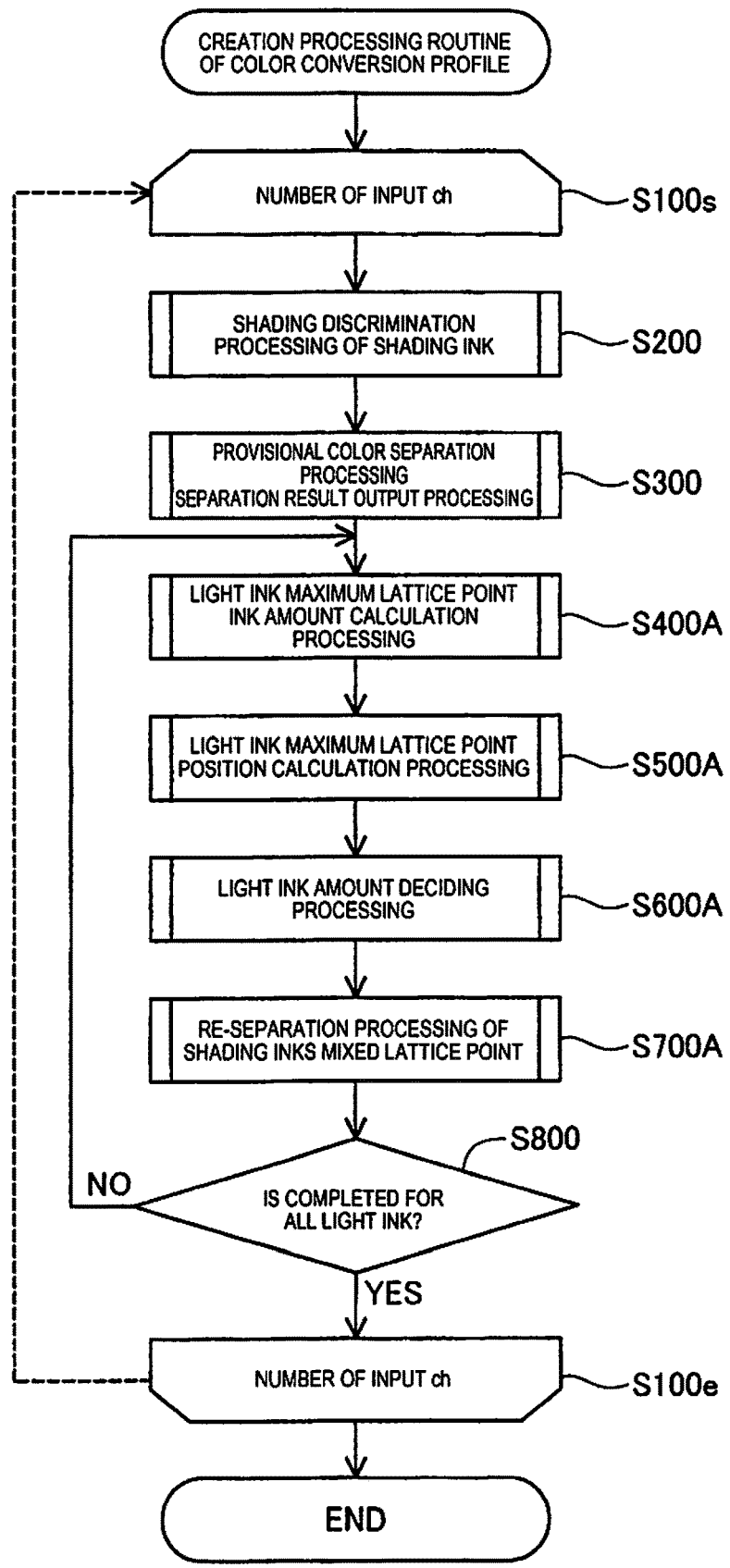
FIG. 14 is a flowchart exemplifying creation processing of a color conversion profile according to a second embodiment.

Next, a second embodiment will be described. A color conversion profile creation device 100 of the second embodiment has the same hardware configuration as that of the first embodiment, and only creation processing of the color conversion profile is different. An outline of the creation processing of the color conversion profile in the second embodiment is shown in FIG. 14. In the second embodiment, three or more kinds of inks having different densities are used as shading inks. Therefore, the shading inks are discriminated in shading discrimination processing of the shading inks (step S200), provisional color separation processing and an output thereof are performed (step S300), then the processing of steps S400A to S700A is performed, and then determination is made whether the processing is completed for all the light inks (step S800). For example, when three kinds of inks having the same system color are assumed to be prepared as the shading inks as described below, for example, when there are N kinds (N≥3) of shading inks (from first to N-th inks) having the same system color such as the lightest ink having the lowest density, an intermediate ink having a density higher than the lightest ink, . . . , and the darkest ink having the highest density, the processing of step S400A and subsequent steps is first performed for the first ink, which is the lightest ink, and the second ink, which is the intermediate ink having the next higher density, and is repeated again for the second ink, which is the intermediate ink, and the third ink having a density higher than the second ink after the determination in step S800. Such processing is repeated until the processing of steps S400A to S700A ends for an (N−1)-th ink and an Nth ink (the darkest ink). Of course, when there are a plurality of input channels, steps S100s to 100e are repeated by the number of input channels.

The processing shown in FIG. 14 will be briefly described with the case where there are three kinds of shading inks having the same system color as an example. The shading discrimination processing of the shading inks and the provisional color separation processing in steps S200 and S300 are basically the same as in the first embodiment. In the shading discrimination processing of the shading inks, the setting is performed from an ink having the smallest virtual CMYK value at each ink station. The darkest ink corresponds to the dark ink of the first embodiment. In the provisional color separation processing, the provisional color separation is performed on the lattice points to be processed only using the darkest ink among the shading inks having the same system color obtained in step S200. As in the first embodiment, the provisional color separation is the processing of obtaining an objective function and then virtually obtaining the color space value of CMYK using the objective function. The fact that the virtual CMYK color space value for the darkest ink of a specific color obtained in this manner becomes the constraint in the processing of step S400A and subsequent steps is also the same as the first embodiment.

Light ink maximum lattice point ink amount calculation processing (step S400A) is the same processing as step S400 in the first embodiment. However, here, the lightest ink is specified as an unfixed light ink at first, and the processing is performed using the lightest ink as the first ink. In this processing, a duty limit value of the ink amount may be used as the setting value of an upper limit of the ink amount. Of course, a desired value may be set in advance as in the first embodiment.

Next, light ink maximum lattice point position calculation processing is performed (step S500A). This processing is also the same as step S500 in the first embodiment, but the lightest ink is specified as an unfixed light ink at first, and the processing is performed using the lightest ink as the first ink. A position of the input channel in step S500A is assumed to be an input channel that makes the virtual color space value of the result of the provisional color separation processing calculated in the provisional color separation processing (step S300), the virtual CMYK value herein, equal to the maximum lattice point ink amount set by another Ink maximum lattice point ink amount calculation processing in step S400A when the reproduction is performed with only the lightest ink. Of course, the lattice point to be processed herein is a lattice point where the ink amount is not fixed. As described below, when the processing for the lightest ink is finished and next the processing for the intermediate ink having a density higher than the lightest ink is performed, in a case where there is an already fixed ink amount, the processing is performed after adding the already decided ink amount.

Following this processing, light ink amount deciding processing is performed (step S600A). This is a processing of deciding the amount of unfixed light ink (the lightest ink at first). This processing is also the same as step S600 in the first embodiment and is the same as step S500A in that only lattice points for which the ink amount is not fixed are targeted. As described below, when the processing for the lightest ink is finished and the processing for the intermediate ink having a density higher than the lightest ink is performed next, in a case where there is an already fixed ink amount, the processing is performed after subtracting the already decided ink amount.

After the above processing, re-separation processing of shading inks mixed lattice point is performed (step S700A). This processing is also the same processing as step S700 in the first embodiment. When step S700A of FIG. 14 is executed first, the mixed lattice point re-separation processing is performed for the lightest ink and the intermediate ink having the density higher than the lightest ink. When the processing for all the light inks is not completed ("NO" in step S800), step S400A and subsequent steps are executed again, and thus step S700A is executed again, the mixed lattice point re-separation processing is performed for the intermediate ink and the darkest ink having a density higher than the intermediate ink.

Figure 15:
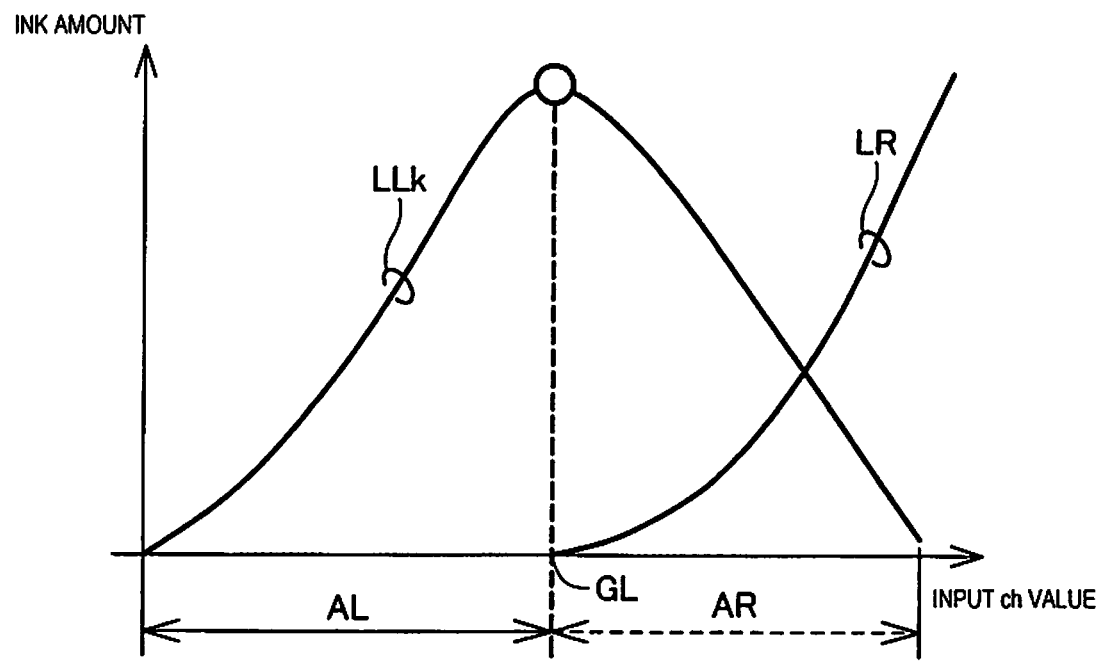
FIG. 15 is an explanatory graph showing an example of a processing result for obtaining an ink amount of the lightest ink.
Figure 16:
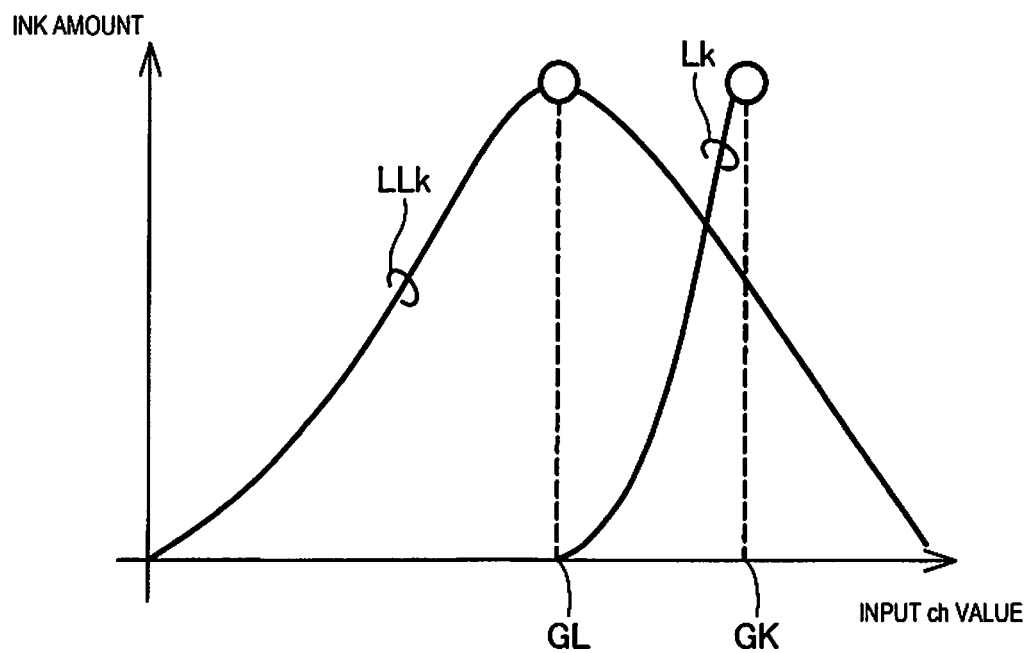
FIG. 16 is an explanatory graph showing an example of re-separation processing for the lightest ink and an intermediate ink.
Figure 17:
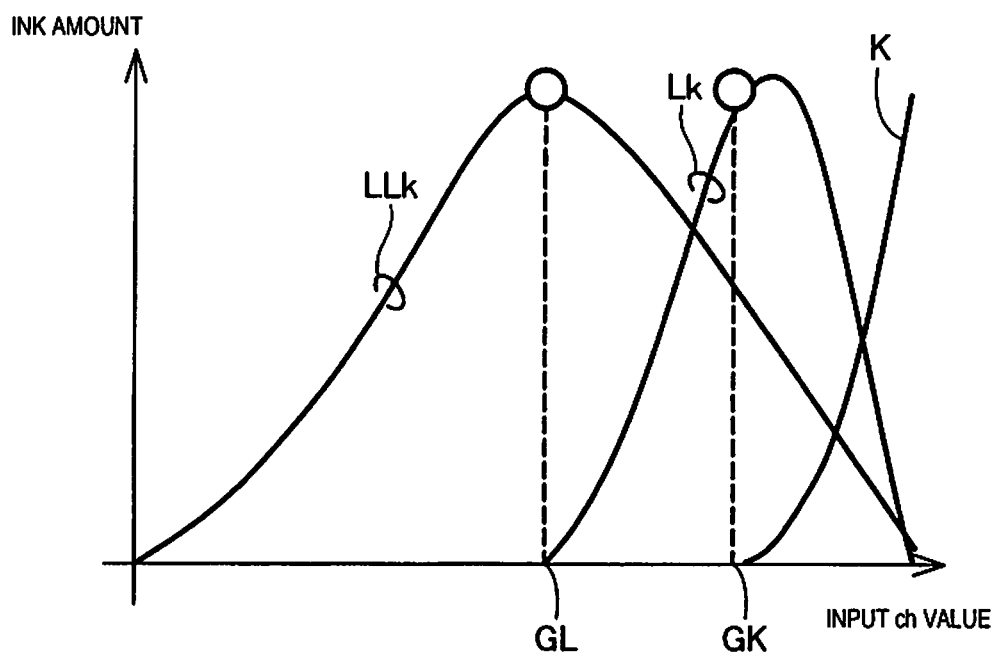
FIG. 17 is an explanatory graph showing an example of re-separation processing for the intermediate ink and a dark ink.

FIGS. 15 to 17 show states where the processing of steps S400A to S700A is performed for three or more kinds of shading inks. The maximum lattice point ink amount, the maximum lattice point position, and the like of the lightest ink LLk are obtained by the processing of steps S400A and S500A. Then, first, the ink amount of the lightest ink LLk is obtained over the range AL up to a light ink maximum lattice point position GL shown in FIG. 15 by the light ink amount deciding processing in step S600A. After the lightest ink LLk is maximized, the lightest ink LLk and the intermediate ink Lk having the next highest density are separated again by the re-separation processing in step S700A, and the ink amount of the lightest ink LLk is fixed in a range AR. At this time, the ink amount of the intermediate ink Lk is not fixed yet.

After the processing in step S700A, determination is made whether the processing for all the light inks is completed. Since the processing is not completed yet, the processing of step S400A and subsequent steps is repeated. This state is shown in FIG. 16. In the second steps S400A and S500A, the maximum lattice point ink amount and a position GK of the maximum lattice point are obtained for the intermediate ink Lk having a density higher than the lightest ink LLk, and the ink amount of the intermediate ink Lk that can realize the virtual CMYK value is obtained in consideration of the fixed ink amount of the lightest ink LLk for a lattice point where the ink amount of the intermediate ink Lk is not fixed yet. The ink amount of the intermediate ink Lk in a range from the maximum lattice point position GL of the lightest ink LLk to the maximum lattice point position GK of the intermediate ink Lk is fixed by this processing. For a range from the maximum lattice point position GK, the ink amount of the intermediate ink Lk is not fixed yet.

Then, the re-separation processing in step S700A is performed between the intermediate ink Lk and the dark ink K. This state is shown in FIG. 17. The ink amount of the lightest ink LLk decided first is not changed, and the ink amounts of the intermediate ink Lk and the dark ink K in the range above the maximum lattice point position GK of the intermediate ink Lk are fixed by the re-separation processing.

In the second embodiment described above, even when three or more kinds of shading inks having the same system color and different shadings are used, it is possible to make the replacement of the inks having respective densities rational with ensured gradation characteristic when combining three or more kinds of shading inks and further enhanced graininess in a high brightness area by the generation ratio of the shading inks. The rational means that a condition of minimizing the objective function is satisfied. Since the objective function is not the same depending on an equation of the curve that decides the gradation change in a predetermined direction, a setting method of the width of the lattice point, or the like, the replacement of respective densities may differ depending on creation methods of the objective function. However, in any case, for the replacement of the inks having respective densities, there is rationality based on the objective function and it is free from arbitrary replacement by a color conversion profile creator.

C. Another Embodiment

The shading ink having the same system color is not limited to two kinds and three kinds and may be four or more kinds. The shading inks are not limited to cyan, magenta, and black, but may be set also for inks having other color tones ink or may be set for a combination of these. Alternatively, the color conversion profile is not limited to the color conversion from RGB to CMYK but may be for conversion between color spaces of the same system such as from RGB to sRGB.

The color conversion profile creation device can be realized by a program on a computer but may be realized by dedicated hardware. The processing may be distributed to a plurality of computers to perform various calculations. Since the calculation amount of the objective function becomes significantly large, a plurality of computers may be configured as a grid to reduce calculation time. Of course, when the color conversion profile creation device is incorporated into a device such as a printer and a new color conversion profile is required, the new color conversion profile may be created on the device side.

(1) In a device for creating a color conversion profile according to an aspect of the present disclosure, the color conversion profile defines a correspondence relationship between a first color space corresponding to a first color system representing an image to be input and a second color space defined by a use amount of each of a plurality of kinds of inks corresponding to a second color system, and the plurality of kinds of inks include a plurality of shading inks having the same system color and different densities. The color conversion profile creation device includes: a shading setting unit that sets a shading relationship between the plurality of shading inks; a provisional color separation unit that performs provisional color separation processing to decide a color space value in a virtual color space in the second color system for every lattice point that defines a correspondence relationship between the first and second color spaces for inks including at least the shading inks among the plurality of kinds of inks; a light ink setting unit that performs first processing of setting a position of the lattice point where a generation amount of the first ink at the lattice point can be maximized and an ink amount at the lattice point for a first ink which is one of light inks other than the highest density ink among the plurality of shading inks from a result of the provisional color separation processing; and an ink amount setting unit that performs second processing of setting an ink amount of the first ink and an ink amount of a second ink which is an ink other than the first ink among the shading inks by giving priority to a use of the first ink while maintaining a virtual color space value of the provisional color separation processing result for the first ink.

According to such a color conversion profile creation device, it is possible to rationally perform the replacement including the replacement start position of shading inks after making the color conversion profile to the color space of the second color system including the plurality of shading inks having the same system color and different densities sufficient in graininess and gradation characteristic by using the shading inks.

(2) In such a color conversion profile creation device, the first ink may be the lowest density ink of the light inks other than the highest density ink among the plurality of shading inks. It is possible to improve the graininess in a high brightness area by applying to the light ink having the lowest density.

(3) In such a color conversion profile creation device, the plurality of shading inks may include three or more inks having different densities, and the ink amount setting unit may perform the first processing and the second processing with the lowest density ink among the three or more inks as the first ink. With this, three or more shading inks having the same system color and different densities can also be processed in the same manner.

(4) In such a color conversion profile creation device, the virtual color space may be formed with white assumed when a use amount of the plurality of kinds of inks defining the second color space is zero as an origin and with a vector formed by a color value of each color of the second color system as a base, and the shading setting unit may obtain the virtual color space value on a color lattice point of the second color system corresponding to a color of the shading ink of each of the plurality of shading inks in the virtual color space and set a shading ink having a smaller virtual color space value as a lighter ink. With this, it is possible to easily set the order of the densities of the shading inks having the same system color.

(5) In such a color conversion profile creation device, the provisional color separation unit may decide the color space value in the virtual color space in the second color system such that a combination of the ink amount of each of the shading inks at the lattice point is most similar to a color in the corresponding first color space. With this, it is possible to easily realize the color separation mixed with shading inks.

(6) In such a color conversion profile creation device, the light ink setting unit may set the position of the lattice point where the generation amount of the first ink at the lattice point can be maximized as a position which is a lower side of either an ink amount set in advance as an upper limit value of the ink amount of the first ink or the ink amount at the position where the generation amount becomes maximum when the virtual color space value obtained by the provisional color separation processing is reproduced only with the first ink. With this, it is possible to easily set the upper limit of the ink amount of the first ink.

(7) In such a color conversion profile creation device, the plurality of shading inks may include three or more inks having different densities, the first processing and the second processing may be performed with the lowest density ink among the three or more inks as the first ink, and then the first processing and the second processing may be performed for a next ink which is a next higher density ink to calculate a maximum position which is a position of the lattice point where a generation amount of the next ink can be maximized by adding the virtual color space value reproduced by the ink amount of the first ink. With this, it is possible to easily obtain the maximum position of the ink amount also for three or more kinds of shading inks.

(8) In such a color conversion profile creation device, for the next ink, when there is an ink amount set in advance as an upper limit value of an ink amount of the next ink, the ink amount at a position where a generation amount becomes maximum may be set as the ink amount and a position of a lattice point where the ink amount of the next ink becomes maximum is decided. With this, it is possible to easily decide the lattice point position where the ink amount becomes maximum also for the next ink which is the next higher density ink after the first processing and the second processing are performed.

(9) In such a color conversion profile creation device, the light ink setting unit may set the ink amount of the first ink at each of the lattice points with only the first ink from a lattice point having the maximum brightness where the ink amount is not fixed to a lattice point of the position where the generation amount of the first ink becomes maximum for the first ink, and set a lattice point after the position where the generation amount becomes maximum by ink amounts of the first and second inks to obtain the ink amounts of the first and second inks again by the color separation processing. With this, it is possible to rationally decide the ink amounts of the first and second inks.

(10) In the color conversion profile creation device described above, the light ink setting unit may be configured to designate the ink amount as the upper limit value of the ink amount of the first ink as an ink amount smaller than the ink amount at the position where the generation amount becomes maximum when the reproduction is performed by only the first ink by a user for every ink including the shading inks among the plurality of kinds of inks. With this, it is possible to easily control the upper limit of the ink amount of the first ink.

(11) In a creation method of a color conversion profile according to an aspect of the present disclosure, the color conversion profile defines a correspondence relationship between a first color space corresponding to a first color system representing an image to be input and a second color space defined by a use amount of each of a plurality of kinds of inks corresponding to a second color system, and the plurality of kinds of inks include a plurality of shading inks having the same system color and different densities. This color conversion profile creation method sets a shading relationship between the plurality of shading inks, performs provisional color separation processing to decide a color space value in a virtual color space in the second color system for every lattice point that defines a correspondence relationship between the first and second color spaces for inks including at least the shading inks among the plurality of kinds of inks, performs first processing of setting a position of the lattice point where a generation amount of the first ink at the lattice point can be maximized and an ink amount at the lattice point for a first ink which is one of light inks other than the highest density ink among the plurality of shading inks from a result of the provisional color separation processing, and performs second processing of setting an ink amount of the first ink and an ink amount of a second ink which is an ink other than the first ink among the shading inks by giving priority to a use of the first ink while maintaining a virtual color space value of the provisional color separation processing result for the first ink.

With this color conversion profile creation method, it is possible to rationally perform the replacement including the replacement start position of shading inks after making the color conversion profile to the color space of the second color system including the plurality of shading inks having the same system color and different densities sufficient in graininess and gradation characteristic by using the shading inks.

(12) In non-transitory computer-readable storage medium storing a program causing the computer to realize a color conversion profile creation method by a computer, the color conversion profile created by the computer defines a correspondence relationship between a first color space corresponding to a first color system representing an image to be input and a second color space defined by a use amount of each of a plurality of kinds of inks corresponding to a second color system, and the plurality of kinds of inks include a plurality of shading inks having the same system color and different densities. The program causing the computer to realize a function of setting a shading relationship between the plurality of shading inks, a function of performing provisional color separation processing to decide a color space value in a virtual color space in the second color system for every lattice point that defines a correspondence relationship between the first and second color spaces for inks including at least the shading inks among the plurality of kinds of inks, a function of performing first processing of setting a position of the lattice point where a generation amount of the first ink at the lattice point can be maximized and an ink amount at the lattice point for a first ink which is one of light inks other than the highest density ink among the plurality of shading inks from a result of the provisional color separation processing, and a function of performing second processing of setting an ink amount of the first ink and an ink amount of a second ink which is an ink other than the first ink among the shading inks by giving priority to a use of the first ink while maintaining a virtual color space value of the provisional color separation processing result for the first ink.

With this color conversion profile creation program, it is possible to realize the creation processing of the color conversion profile described above by the computer.

The present disclosure is not limited to the above embodiments and can be realized in various configurations within the scope not departing from the spirit of the present disclosure. For example, it is possible to replace or combine the technical features of the embodiments corresponding to the technical features in each aspect described in the section of summary as appropriate to solve some or all of the problems described above or achieve some or all of the effects described above. When the technical features are not described as essential in the present specification, it is possible to delete the features as appropriate. For example, a part of the configuration realized by hardware in the above embodiments can be realized by software.

What is claimed is:

1. A color conversion profile creation device which is a device for creating a color conversion profile, in which the color conversion profile defines a correspondence relationship between a first color space corresponding to a first color system representing an image to be input and a second color space defined by a use amount of each of a plurality of kinds of inks corresponding to a second color system, and the plurality of kinds of inks include a plurality of shading inks having the same system color and different densities, the color conversion profile creation device comprising:
    a shading setting unit that sets a shading relationship between the plurality of shading inks;
    a provisional color separation unit that performs provisional color separation processing to decide a color space value in a virtual color space in the second color system for every lattice point that defines a correspondence relationship between the first and second color spaces for inks including at least the shading inks among the plurality of kinds of inks;
    a light ink setting unit that performs first processing of setting a position of the lattice point where a generation amount of the first ink at the lattice point can be maximized and an ink amount at the lattice point for a first ink which is one of light inks other than the highest density ink among the plurality of shading inks from a result of the provisional color separation processing; and
    an ink amount setting unit that performs second processing of setting an ink amount of the first ink and an ink amount of a second ink which is an ink other than the first ink among the shading inks by giving priority to a use of the first ink while maintaining a virtual color space value of the provisional color separation processing result for the first ink.

2. The color conversion profile creation device according to claim 1, wherein
    the first ink is the lowest density ink of the light inks other than the highest density ink among the plurality of shading inks.

3. The color conversion profile creation device according to claim 1, wherein
    the plurality of shading inks include three or more inks having different densities, and
    the ink amount setting unit performs the first processing and the second processing with the lowest density ink among the three or more inks as the first ink.

4. The color conversion profile creation device according to claim 1, wherein
    the virtual color space is formed with white assumed when a use amount of the plurality of kinds of inks defining the second color space is zero as an origin and with a vector formed by a color value of each color of the second color system as a base, and
    the shading setting unit obtains the virtual color space value on a color lattice point of the second color system corresponding to a color of the shading ink of each of the plurality of shading inks in the virtual color space and sets a shading ink having a smaller virtual color space value as a lighter ink.

5. The color conversion profile creation device according to claim 1, wherein
    the provisional color separation unit decides the color space value in the virtual color space in the second color system such that a combination of the ink amount of each of the shading inks at the lattice point is most similar to a color in the corresponding first color space.

6. The color conversion profile creation device according to claim 1, wherein
    the light ink setting unit sets the position of the lattice point where the generation amount of the first ink at the lattice point can be maximized as a position which is a lower side of either an ink amount set in advance as an upper limit value of the ink amount of the first ink or the ink amount at the position where the generation amount becomes maximum when the virtual color space value obtained by the provisional color separation processing is reproduced only with the first ink.

7. The color conversion profile creation device according to claim 1, wherein
    the light ink setting unit sets the position of the lattice point where the generation amount of the first ink at the lattice point can be maximized as a position which is a lower side of either an ink amount set in advance as an upper limit value of the ink amount of the first ink or the ink amount at the position where the generation amount becomes maximum when the virtual color space value obtained by the provisional color separation processing is reproduced only with the first ink, and
    the plurality of shading inks include three or more inks having different densities, the first processing and the second processing are performed with the lowest density ink among the three or more inks as the first ink, and then the first processing and the second processing are performed for a next ink which is a next higher density ink to calculate a maximum position which is a position of the lattice point where a generation amount of the next ink can be maximized by adding the virtual color space value reproduced by the ink amount of the first ink.

8. The color conversion profile creation device according to claim 1, wherein
- the light ink setting unit sets the position of the lattice point where the generation amount of the first ink at the lattice point can be maximized as a position which is a lower side of either an ink amount set in advance as an upper limit value of the ink amount of the first ink or the ink amount at the position where the generation amount becomes maximum when the virtual color space value obtained by the provisional color separation processing is reproduced only with the first ink, and
- the plurality of shading inks include three or more inks having different densities, the first processing and the second processing are performed with the lowest density ink among the three or more inks as the first ink, then the first processing and the second processing are performed for a next ink which is a next higher density ink to calculate a maximum position which is a position of the lattice point where a generation amount of the next ink can be maximized by adding the virtual color space value reproduced by the ink amount of the first ink, and, for the next ink, when there is an ink amount set in advance as an upper limit value of an ink amount of the next ink, the ink amount at a position where a generation amount becomes maximum is set as the ink amount and a position of a lattice point where the ink amount of the next ink becomes maximum is decided.

9. The color conversion profile creation device according to claim 1, wherein
- the light ink setting unit sets the position of the lattice point where the generation amount of the first ink at the lattice point can be maximized as a position which is a lower side of either an ink amount set in advance as an upper limit value of the ink amount of the first ink or the ink amount at the position where the generation amount becomes maximum when the virtual color space value obtained by the provisional color separation processing is reproduced only with the first ink,
- the plurality of shading inks include three or more inks having different densities, the first processing and the second processing are performed with the lowest density ink among the three or more inks as the first ink, and then the first processing and the second processing are performed for a next ink which is a next higher density ink to calculate a maximum position which is a position of the lattice point where a generation amount of the next ink can be maximized by adding the virtual color space value reproduced by the ink amount of the first ink, and
- the light ink setting unit sets the ink amount of the first ink at each of the lattice points with only the first ink from a lattice point having the maximum brightness where the ink amount is not fixed to a lattice point of the position where the generation amount of the first ink becomes maximum for the first ink, and sets a lattice point after the position where the generation amount becomes maximum by ink amounts of the first and second inks to obtain the ink amounts of the first and second inks again by the color separation processing.

10. The color conversion profile creation device according to claim 1, wherein
- the light ink setting unit sets the position of the lattice point where the generation amount of the first ink at the lattice point can be maximized as a position which is a lower side of either an ink amount set in advance as an upper limit value of the ink amount of the first ink or the ink amount at the position where the generation amount becomes maximum when the virtual color space value obtained by the provisional color separation processing is reproduced only with the first ink, and
- the light ink setting unit is configured to designate the ink amount as the upper limit value of the ink amount of the first ink as an ink amount smaller than the ink amount at the position where the generation amount becomes maximum when the reproduction is performed by only the first ink by a user for every ink including the shading inks among the plurality of kinds of inks.

11. A color conversion profile creation method which is a method of creating a color conversion profile, in which the color conversion profile defines a correspondence relationship between a first color space corresponding to a first color system representing an image to be input and a second color space defined by a use amount of each of a plurality of kinds of inks corresponding to a second color system, and the plurality of kinds of inks include a plurality of shading inks having the same system color and different densities, the method comprising:
- setting a shading relationship between the plurality of shading inks;
- performing provisional color separation processing to decide a color space value in a virtual color space in the second color system for every lattice point that defines a correspondence relationship between the first and second color spaces for inks including at least the shading inks among the plurality of kinds of inks;
- performing first processing of setting a position of the lattice point where a generation amount of the first ink at the lattice point can be maximized and an ink amount at the lattice point for a first ink which is one of light inks other than the highest density ink among the plurality of shading inks from a result of the provisional color separation processing; and
- performing second processing of setting an ink amount of the first ink and an ink amount of a second ink which is an ink other than the first ink among the shading inks by giving priority to a use of the first ink while maintaining a virtual color space value of the provisional color separation processing result for the first ink.

12. A non-transitory computer-readable storage medium storing a color conversion profile creation program which is a program that creates a color conversion profile by a computer, in which the color conversion profile created by the computer defines a correspondence relationship between a first color space corresponding to a first color system representing an image to be input and a second color space defined by a use amount of each of a plurality of kinds of inks corresponding to a second color system, and the plurality of kinds of inks include a plurality of shading inks having the same system color and different densities, the program causing the computer to realize:
- a function of setting a shading relationship between the plurality of shading inks;
- a function of performing provisional color separation processing to decide a color space value in a virtual color space in the second color system for every lattice point that defines a correspondence relationship between the first and second color spaces for inks including at least the shading inks among the plurality of kinds of inks;
- a function of performing first processing of setting a position of the lattice point where a generation amount of the first ink at the lattice point can be maximized and an ink amount at the lattice point for a first ink which is one of light inks other than the highest density ink among the plurality of shading inks from a result of the provisional color separation processing; and a function of performing second processing of setting an ink amount of the first ink and an ink amount of a second ink which is an ink other than the first ink among the shading inks by giving priority to a use of the first ink while maintaining a virtual color space value of the provisional color separation processing result for the first ink.

* * * * *